July 21, 1942.  H. R. BASSETT  2,290,796
FILTER
Filed Dec. 7, 1939   2 Sheets-Sheet 2
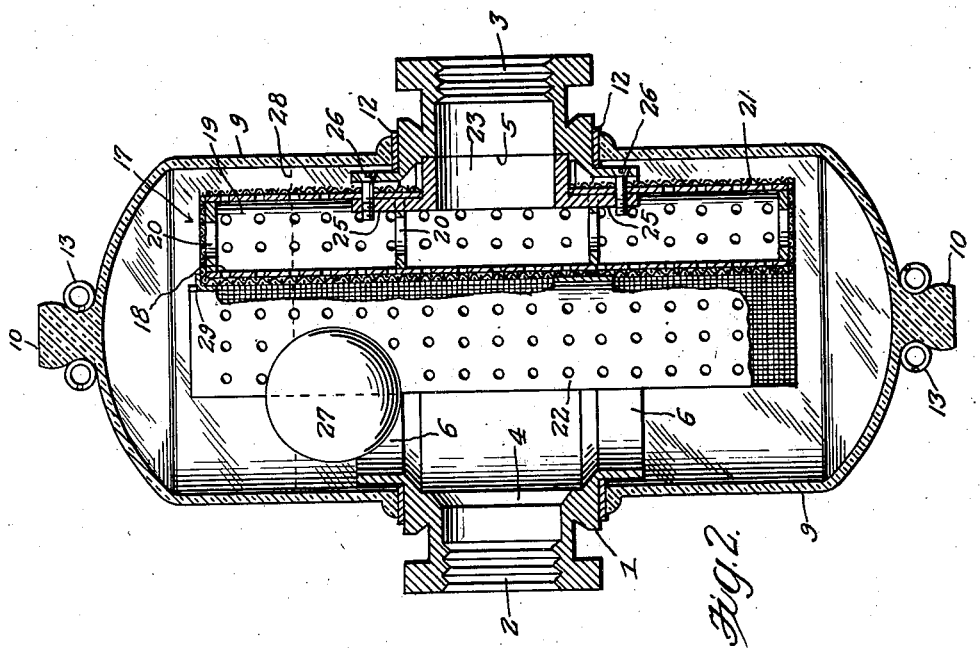
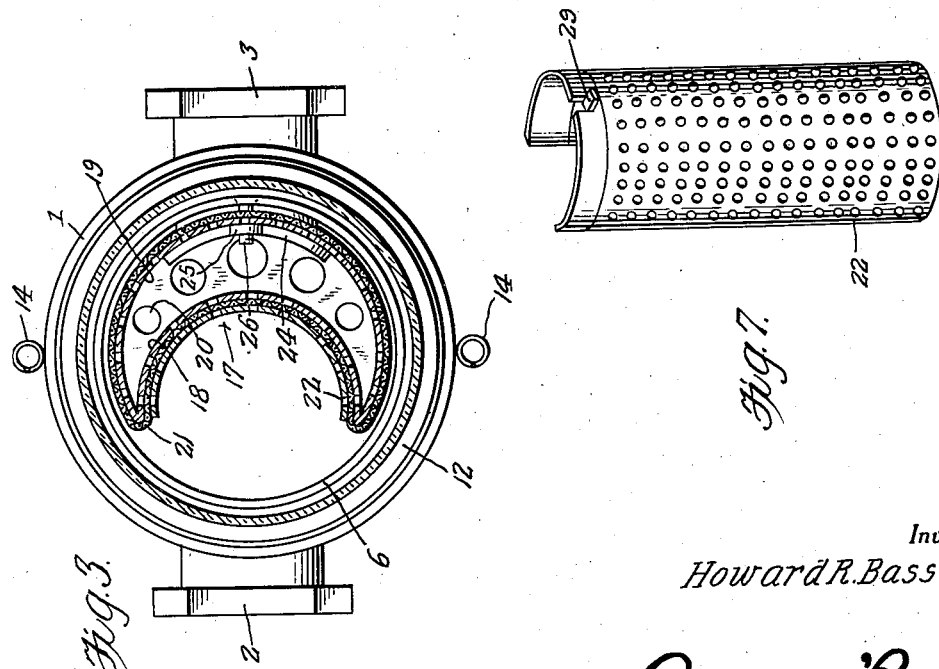
Inventor
Howard R. Bassett.
By Clarence A. O'Brien
and Hyman Berman
Attorneys Patented July 21, 1942

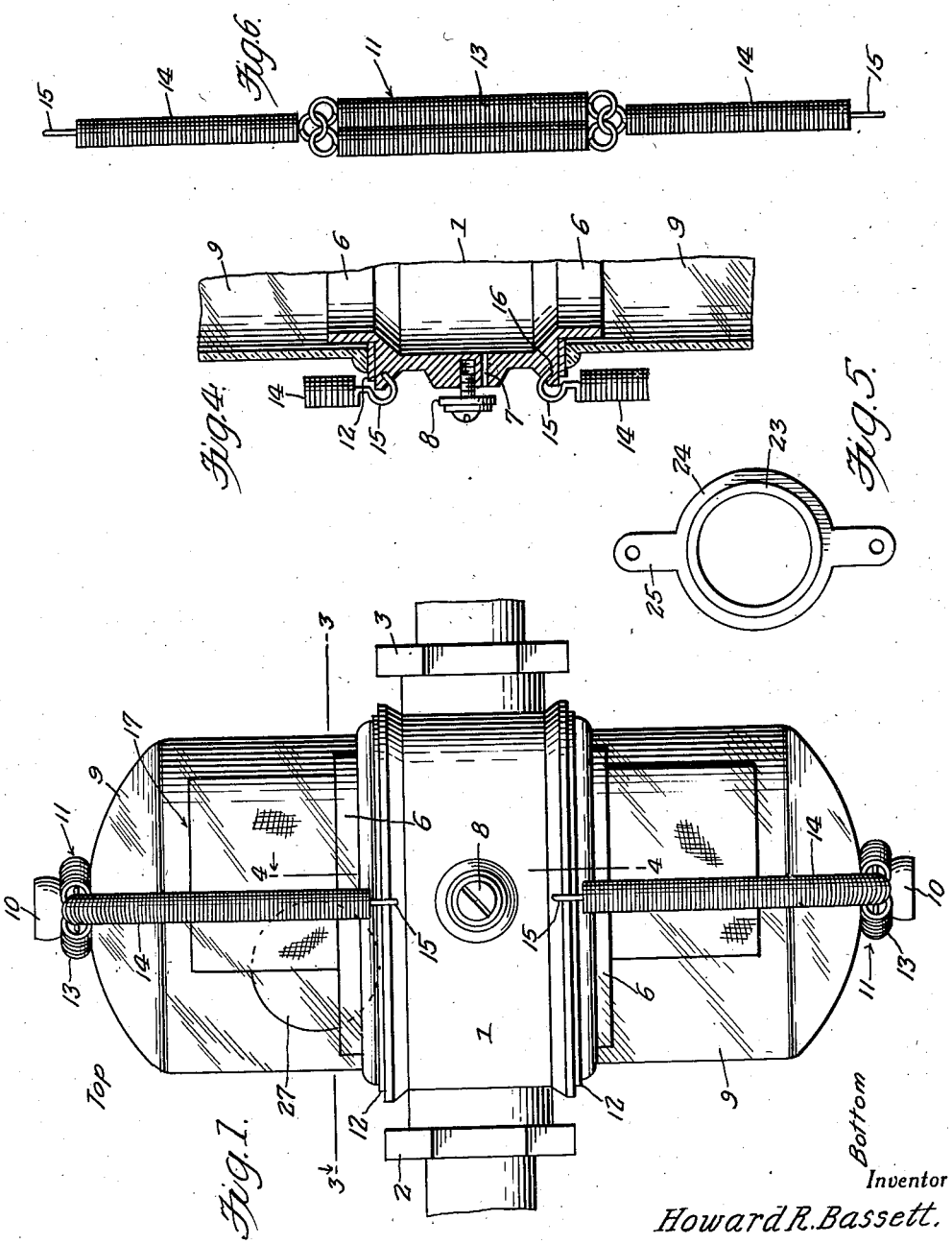

2,290,796

UNITED STATES PATENT OFFICE 2,290,796

FILTER

Howard R. Bassett, Taunton, Mass.

Application December 7, 1939, Serial No. 308,069

2 Claims. (Cl. 210—165)

The present invention relates to new and useful improvements in filters for use particularly in the suction line from a well to an electric pump but it will be understood, of course, that the device may be used for any other purpose for which it may be found adapted and desirable.

An important object of the invention is to provide, in a manner as hereinafter set forth, a filter of the aforementioned character comprising a strainer unit embodying a novel construction and arrangement which is such as to provide a comparatively large area or surface through which the fluid may pass, thereby assuring maximum efficiency.

Another important object of the invention is to provide a filter of the character described which may be expeditiously disassembled for cleaning or other purposes when desired.

Still another very important object of the invention is to provide a filter of the character set forth comprising means including a vent and ball check valve for controlling back flow of the fluid to the well.

A still further important object of the invention is to provide a filter of such construction that the operation of the device may be conveniently observed.

Other objects of the invention are to provide a filter of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a filter constructed in accordance with the present invention.

Figure 2 is a view in vertical section through the device, the removable strainer unit shield being broken away.

Figure 3 is a horizontal sectional view, taken substantially on the line 3—3 of Fig. 1.

Figure 4 is a vertical sectional view through a side portion of the device.

Figure 5 is a detail view in front elevation of the strainer fitting.

Figure 6 is a plan view of one of the resilient securing devices for the removable transparent bowls.

Figure 7 is a detail view in perspective of the removable shield which is provided for the strainer unit.

Referring now to the drawings in detail, it will be seen that the embodiment of the invention which has been illustrated comprises an annular shell 1 of suitable material, preferably metal. On diametrically opposite sides the shell 1 is provided with an internally threaded inlet 2 and an internally threaded outlet 3. It may be well to here state that the shell 1 is to be interposed in the suction line preferably at a point close to the pump. The inner end portion of the inlet 2 is formed to provide a valve seat 4. The inner end of the outlet 3 is formed to provide a seat 5 the purpose of which will be presently set forth.

The shell 1 further includes vertical necks 6 on its upper and lower ends. Referring now to Figure 4 of the drawings, it will be observed that the shell 1 is provided with a vent 7. A manually operable valve 8 which is threadedly mounted on the shell 1 controls the vent 7.

Removably mounted on the upper and lower ends of the annular shell 1 are bowls 9 of glass or other suitable transparent material. It will be observed that the necks 6 project into the bowls 9. Integral knobs 10 are provided on the closed ends of the bowls 9. The bowls 9 are removably secured in position on the shell 1 through the medium of resilient fasteners which are designated generally by the reference numeral 11. Gaskets 12 of suitable material prevent leakage between the bowls 9 and the shell 1.

The resilient fasteners 11 include pairs of parallel intermediate springs 13 which are adapted to receive the knobs 10 therebetween. The pairs of intermediate springs 13 are connected to single end springs 14. The springs 14 terminate, at one end, in hooks 15 (see Fig. 4) which are engageable in sockets 16 provided therefor in the shell 1 for anchoring the connectors 11 thereto under tension.

Removably mounted in the shell 1 and extending upwardly and downwardly therefrom into the bowls is a strainer unit or assembly which is designated generally by the reference numeral 17. The strainer unit 17 is substantially crescent shaped and comprises perforated plates 18 and 19 between which apertured spacers 20 are secured at vertically spaced points. The entire strainer is provided with a covering 21 of wire cloth. Removably mounted on the front of the strainer unit 17 is a perforated shield 22 of suitable metal or other material. Of course, the shield 22 conforms substantially to the shape of the front of the strainer unit 17. It may be well to here state that the shield 22 is slipped on and off the strainer unit 17 from the upper end of said unit. A lug 29 is struck from the upper portion of the shield 22 for engagement with the upper end of the strainer unit 17 for supporting said shield thereon.

The strainer unit further includes a fitting 23 for mounting said strainer unit in the shell 1. The fitting 23 extends through an opening provided therefor in the plate 19 and is engageable with the seat 5 in the outlet 3. Projecting vertically from the flanged inner end 24 of the fitting 23 are arms 25 which accommodate securing screws 26 mounted in the necks 6. It will be noted that the screws 26 are countersunk in the necks 6.

The reference numeral 27 designates a ball float valve which is engageable with the seat 4. The substantially crescent shaped strainer unit 17 accommodates the valve 27. This is illustrated to advantage in Figure 2 of the drawings.

It is thought that the operation of the device will be readily apparent from a consideration of the foregoing, particularly to those skilled in the art to which the invention pertains. Briefly, with the pump in operation and the vent 7 closed, fluid is drawn into the device through the inlet 2 and rises to approximately the level indicated by the broken line 28 in Figure 2 of the drawings, thereby lifting the ball float valve 27 well above said inlet 2. The vacuum or suction created in the device draws the bowls 9 tightly against the gaskets 12 in a manner to positively prevent leakage. The fluid flows freely around the strainer unit 17 and enters said unit through the wire cloth, the perforated plates 18 and 19, etc. Of course, the strained fluid leaves the device through the outlet 3. Particles of scale, sediment and other foreign matter in the fluid are arrested by the wire cloth 21 and drop by gravity into the lower bowl 9 each time the pumping operation ceases. As the wire cloth 21 becomes fouled and clogged the fluid rises in the device and flows through a clean or unclogged portion of said wire cloth. This continues until substantially the entire area of the strainer unit 17 has become clogged, which condition may be conveniently observed through the transparent bowls 9. The device is now ready for cleaning. This operation is performed by first opening the vent 7, thereby breaking the vacuum which has been created in the device. When the vacuum is thus broken the fluid in the device rushes back through the inlet 2 toward the well and engages the ball float valve 27 on the seat 4. Thus, the suction line is sealed at this point. The upper bowl 9 may now be removed by simply detaching its fastener 11 from the shell 1 in an obvious manner. The fluid remaining in the suction line to the pump and in the lower portion of the device is then siphoned off after which the lower bowl 9 is removed from the shell 1. The strainer unit 17 is now taken out of the shell 1 by removing the screws 26 and the shield 22 is removed. After cleaning, the device is reassembled. When the vent 7 is again closed and the pump started a vacuum will build up in the device equal to that in the suction line to the well at which time the ball float valve 27 will drop away from the seat 4 and the device is again in operation. The removable, perforated shield 22 mounted on the front of the strainer unit 17 protects the wire cloth 21 against damage from incoming particles of hard foreign matter as well as against frictional contact with the ball float 27.

It is believed that the many advantages of a filter constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A filter of the character described comprising an annular shell open at its ends and having an inlet and an outlet, transparent bowls removably mounted on the ends of said shell, knobs on said bowls, resilient fasteners engaged with said knobs and connected to the shell for securing the bowls thereto, and a substantially crescent shaped strainer unit mounted in the shell between the inlet and outlet and projecting into the bowls.

2. A filter comprising a shell provided with an inlet and an outlet, and upper and lower openings, and also having a valve seat at the inner end of the inlet and a seat at the inner end of the outlet, an elongated strainer substantially crescent-shape in cross section arranged vertically in said shell and including spaced, foraminous walls, said strainer having an opening in the wall thereof at the convex side of the strainer and substantially aligning with said outlet, a fitting extending outwardly of the strainer through said opening and provided at one end with a flange internally of the strainer, with the outer end of said fitting engaging in the aforementioned seat at the inner end of said outlet, means securing said strainer in fixed position within said shell and with its upper and lower ends projecting through the respective upper and lower openings of the shell, said strainer securing means including means for securing the fitting in fixed position with respect to said strainer, and a ball float valve freely movable in the shell at the concave side of said strainer and engageable with the seat and the inner end of said inlet, a transparent bowl extending upwardly from the upper opening of the shell and a transparent bowl extending downwardly from the lower opening and respectively accommodating the aforementioned ends of said strainer, and fastening means engaged with said bowls and said shell for securing the bowls in position on the shell.

HOWARD R. BASSETT.